United States Patent
Waidmann et al.

(10) Patent No.: US 10,620,822 B2
(45) Date of Patent: Apr. 14, 2020

(54) METHOD AND SYSTEM FOR SELECTING AND PROVIDING CONTENT OF INTEREST

(75) Inventors: Andrea Waidmann, Hamburg (DE); Irina Thoss, Hamburg (DE); Freddie Geier, Hamburg (DE); Andreas Geier, Hamburg (DE); Michael Hermann, Hamburg (DE); Thomas Hartmann, Hamburg (DE)

(73) Assignee: Adventures GMBH, Hamburg (DE)

(*) Notice: Subject to any disclaimer, the term of this patent is extended or adjusted under 35 U.S.C. 154(b) by 748 days.

(21) Appl. No.: 13/292,964

(22) Filed: Nov. 9, 2011

(65) Prior Publication Data
US 2013/0117161 A1 May 9, 2013

(51) Int. Cl.
| | |
|---|---|
| G06Q 30/00 | (2012.01) |
| G06F 3/0488 | (2013.01) |
| G06Q 30/06 | (2012.01) |

(52) U.S. Cl.
CPC ......... G06F 3/04883 (2013.01); G06Q 30/06 (2013.01); G06Q 30/0641 (2013.01); G06Q 30/0643 (2013.01)

(58) Field of Classification Search
CPC ........... G06Q 30/0631; G06Q 30/0643; G06Q 30/06; G06Q 30/0641; G06F 3/04883
USPC .............................................. 705/26.7, 27.1
See application file for complete search history.

(56) References Cited

U.S. PATENT DOCUMENTS

| | | | |
|---|---|---|---|
| 6,615,208 B1* | 9/2003 | Behrens | G06Q 30/0631 707/754 |
| 8,434,001 B2* | 4/2013 | Kandekar et al. | 715/234 |
| 2004/0249824 A1* | 12/2004 | Brockway et al. | 707/100 |
| 2008/0162238 A1* | 7/2008 | Subbu et al. | 705/8 |
| 2008/0189268 A1* | 8/2008 | Au | 707/5 |
| 2011/0193788 A1 | 8/2011 | King et al. | |
| 2011/0197153 A1 | 8/2011 | King et al. | |
| 2012/0023104 A1* | 1/2012 | Johnson et al. | 707/740 |
| 2012/0079372 A1* | 3/2012 | Kandekar | G06F 17/2745 715/256 |
| 2012/0109966 A1* | 5/2012 | Liang et al. | 707/740 |
| 2012/0143590 A1* | 6/2012 | Ajima | G06F 17/241 704/2 |

OTHER PUBLICATIONS

Ding, Chris HQ. "A similarity-based probability model for latent semantic indexing." (Year: 1999).*

Salton, G., A. Wong, and C. S. Yang, "A Vector Space Model for Automatic Indexing", *Communications of the ACM*, vol. 18, No. 11, (Nov. 1975), pp. 613-620 [online] [retrieved on Dec. 23, 2013]. Retrieved from the Internet: <URL: http://citeseerx.ist.psu.edu/viewdoc/download?doi=10.1.1.107.7453&rep=rep1&type=pdf>.

(Continued)

*Primary Examiner* — Matthew E Zimmerman
(74) *Attorney, Agent, or Firm* — Kilpatrick Townsend & Stockton LLP (57) ABSTRACT

A method for selecting content of interest includes detecting the contact area of a user's finger or a marking element marking a region of a touch-sensitive display, and recording a cumulative area contacted by the user's finger or the marking element during one marking motion. The cumulative area can be the selected content of interest.

19 Claims, 7 Drawing Sheets

(56) References Cited

OTHER PUBLICATIONS

"Vector Space Model". MOLE—Text Analysis Group [online]. Technical University of Denmark, Section for Digital Signal Processing, 1999 [retrieved Dec. 23, 2013]. Retrieved from the Internet: <URL: http://cogsys.imm.dtu.dk/thor/projects/multimedia/textmining/node5.html>.

Deerwester, Scott, et al., "Indexing by Latent Semantic Analysis", *Journal of the American Society for Information Science*, vol. 41, No. 6, (Sep. 1990), pp. 391-407 [online] [retrieved on Dec. 23, 2013]. Retrieved from the Internet: <URL: http://www.stat.cmu.edu/~cshalizi/350/2008/readings/Deerwester-et-al.pdf>.

\* cited by examiner

METHOD AND SYSTEM FOR SELECTING AND PROVIDING CONTENT OF INTEREST

TECHNICAL FIELD

The present subject matter is generally related to personal data systems in the field of digital reading. It addresses the consumer's need for selecting, collecting, storing, and managing digital content from magazines, newspapers, and websites. Embodiments of the invention relate to a method and device for selecting content of interest from a content displayed on a display. Embodiments of the invention further relate to a method and system for providing content of interest to a user. Furthermore, the invention relates to a method and system for purchasing content of interest, in particular publisher content.

BACKGROUND OF THE INVENTION

Methods for selecting content of interest from a content displayed on a display are generally known in the prior art. US 2011/0197153 A1 discloses a user interface of a device for presenting a display object. The user interface receives touch input from a user at a location on the user interface. Such input corresponds to gestures executed by the user on a user interface. These gestures can be a digging gesture leading to a graphical representation of the gesture, e.g. an opening in form of a hole or a tunnel, at the location where the user has executed the digging gesture. Also, such a gesture can be the drawing of a pattern on the user interface. A further input from a user can be the moving of the display object over the opening, wherein the display object is processed in response to the further input.

US 2011/0193788 A1 discloses a device displaying a user interface where a first graphical object is transformed into a second graphical object that responds to touch or motion input. A user can interact with the device using various touch inputs, e.g. when a user touches a touch-sensitive display of the device. An example gesture input is a swipe input, where a user swipes his or her finger (or other input tool) across the touch-sensitive display. As an example the user can use a finger to draw a circle around icons to indicate that the icons are to be grouped together. This is achieved for example if the user touches the display at a touch point and draws a circle around the icons without removing the finger from the display. A slash line or visual indication can be displayed to show the circle to visually indicate to the user that the icons are selected for inclusion into a group.

BRIEF SUMMARY OF THE INVENTION

It is an object of the present invention to provide an enhanced method and device for selecting content of interest from a content displayed on a display. It is a further object of the present invention to provide an enhanced method and system for providing content of interest to a user. It is an even further object of the present invention to provide an enhanced method and system for purchasing content of interests, in particular publisher content. Embodiments of the invention may satisfy some, none, or all of these objects.

These and other objects can be achieved by a method for selecting content of interest from a content displayed on a display according to the introductory comprising the steps: detecting the contact area of a user's finger or a marking element marking a region of a touch-sensitive display, and recording a cumulative area contacted by the user's finger or the marking element during one marking motion, wherein said cumulative area is defined as the surface parts of the touch-sensitive display contacted by the user's finger or the marking element, respectively, in a motion of the finger or marking element, respectively, in a continuous contact to said touch-sensitive display, and processing the content shown in the cumulative area as selected content of interest.

By this method, a simple and intuitive method for selecting content of interest on a touch-sensitive display is provided. In contrast to methods where, for example, a circle is drawn on a touch-sensitive display and thereby the content shown in the circle is selected for further processing, the method according to the present invention only highlights exactly the area having been touched by a finger or a marking element during one marking motion. To this regard, it is important to note that any surface parts which have not been in direct contact with the user's finger or the marking element during said continuous motion are not included into the cumulative area, even if these surface parts are encircled by said motion. Further, it is important to note that only in case of the user's finger or the marking element performing a motion in continuous contact to the touch-sensitive display a cumulative area is recorded whereas a single contact without a motion of the finger or marking element shall not result in such recordation of a cumulative area. The term "continuous contact" can be understood as a contact of the finger or marking element to the display which starts at a first contact time and ends at a last contact time and shall not be interrupted by a time period wherein no contact between the finger/the marking element is present. Alternatively, a motion, wherein said finger/marking element is not in contact with the display for short time period below a predetermined time period during two or more consecutive motions shall be interpreted as one single motion resulting in a recordation of one single cumulative area including all those regions which experienced direct contact to the finger/contact element during the two or more consecutive motions.

This method according to the present invention is comparable to drawing with a finger on a steamed-up window, wherein only the cumulative contact area of the finger on the window during the drawing motion is cleared up. The term "drawing motion" can be understood as a single wiping or rubbing motion or as a plurality of wiping or rubbing motions in different directions resulting in a cumulative area contacted by the finger. A marking motion is, e.g., completed when the finger is lifted from the touch-sensitive display. As an alternative, a marking motion can be completed when the finger is lifted from the touch-sensitive display for a predetermined time interval. I.e., if the finger is lifted from the touch-sensitive display and is put back on within the predetermined time-interval, the snippet can be adjusted, e.g., enlarged, expanded, widened, etc. Preferably, the method can be enhanced by a functionality for editing the snippet at a later point in time, even after the predetermined time-interval has elapsed.

The method according to the present invention can be used for selecting any kind of content such as publisher content, content provided by an internet website, and also content such as images to be processed in a graphics software or edited in an image editing software, i.e. a computer program adapted to allow a user to manipulate visual images on a computer client.

The processing of the content may be understood as extracting and storing the selected content, e.g., in a personal user database or via a cloud storage service, where the content data is stored in a plurality of storage servers provided by a storage service provider or provided by third parties.

According to a further embodiment of the method according to the present invention the cumulative area is highlighted on the display. The highlighting may be executed by providing an increased illumination intensity in the cumulative area compared to the illumination intensity in the area of the display which is not the cumulative area. Furthermore, the highlighting may take place by darkening the area of the display which is not the cumulative area and leaving the cumulative area at a predetermined normalized illumination intensity. Even further, the highlighting may take place by changing the color in the cumulative area and/or in the area which is not the cumulative area. Furthermore, the area which is not the cumulative area can be display in a hatched way.

According to a further preferred embodiment of the present invention the content is a published magazine, newspaper, book, monograph, and/or periodical, an issue of a published magazine, newspaper, book, and/or periodical, an article of a published magazine, newspaper, and/or periodical, and/or a section of a book. Even further preferred the content shown in the cumulative area can be a snippet of a published magazine, newspaper, book, monograph, and/or periodical, or a snippet of an article of a published magazine, newspaper, and/or periodical, and/or a snippet of a section of a book. The content is preferably provided in electronic form, e.g., in form of PDF-documents (PDF: Portable Document Format) or any other electronic format used by devices such as computer clients to present information to users, e.g., HTML (Hypertext Markup Language), XML (Extensible Markup Language), etc.

In a further preferred embodiment of the present invention the touch-sensitive display is part of a computer client, in particular a personal computer, a tablet personal computer, a cellular telephone, a camera, a smart phone, a media player, a navigation device, a game console, or a laptop computer. Preferably, the touch-sensitive display is an integral part of the computer client, e.g., in form of a tablet personal computer.

According to a further preferred embodiment of the present invention the marking element is a stylus or a touch pen. Thereby, the method can also be used in devices with a touch-sensitive display being operated by a stylus or a touch pen.

In a further preferred embodiment of the present invention the processing comprises extracting of text from the content, recognizing of pictures, and/or recognizing of faces shown in the pictures. The extraction of text from the content can, e.g., be realized by existing optical character recognition methods. For the recognizing of faces, existing face recognition systems can be utilized. Even further preferred the processing may comprise the extraction of entities such as persons, organizations, places, dates, contact information, and/or links for further processing. An example of a further processing can be the provision of a date extracted from the selected content of interest to a calendar function of the computer client. This provision can take place automatically or in a way that the user needs to activate or authorize the provision of the date to the calendar function.

A further aspect of the invention is a device for selecting content of interest from a content displayed on a display, comprising: a touch-sensitive display adapted to detect the contact area of a user's finger or a marking element marking a region of the touch-sensitive display, and a recording entity, which may comprise a processor and a memory which are adapted to record and store the cumulative area contacted by the user's finger or the marking element during one marking motion. The processor may also process the content shown in the cumulative area as selected content of interest.

According to a preferred embodiment of the device according to the present invention the display highlights the cumulative area.

In a further preferred embodiment of the device according to the present invention the recording entity is a processor in connection with an electronic memory, preferably as part of the computer client. This provides for an electronic recording entity which can preferably be an integral part of the computer client. The device for selecting the content of interest can be a computer client, in particular a personal computer, a tablet personal computer, a cellular telephone, a camera, a smart phone, a media player, a navigation device, a game console, or a laptop computer. The electronic memory can be a volatile memory, i.e. a semiconductor memory requiring power to maintain the stored information, or a non-volatile memory, i.e. a semiconductor memory that can retain the stored information even when not provided with power. Further, a memory according to embodiments of the invention may be composed of one or more data storage devices using any suitable electrical, optical and/or magnetic data storage mechanism.

A further aspect of the invention is a method for providing content of interest to a user, comprising the steps: displaying content provided by a content database, in particular publisher content, selecting a content of interest from the displayed content, creating a semantic index of the selected content of interest, and providing further content of interest from the content provided by the content database based on a semantic index of the further content of interest by comparing the semantic index of the further content of interest to the semantic index of the selected content of interest.

Thereby, a method is provided which enables a user to retrieve further content of interest which is similar to the selected content of interest, e.g., a further content of interest has a similar subject matter to the subject matter of the selected content of interest. For example, if a content of interest is an article from a newspaper or magazine, the method provides similar articles with regard to the content of the article, i.e. with regard to the subject matter, topic, concept, and/or idea of the article. In particular, e.g., if a content of interest is an article concerning a certain product, the further content of interest can be an article, an advertisement, or the like concerning the same or a similar product from a different magazine.

In an exemplary embodiment of the method according to the present invention a user is reading a non-advertising review on a television set. If the user taps on the article via his or her finger touching the touch-sensitive display, additional information about the products is provided to the user so that he or she can, for example, purchase the product or access further information from a website, etc. In a further exemplary embodiment of the method according to the present invention, a user is reading an article on a Safari to Africa. When selecting this content, additional information such as travel agency information, clothing information for Africa, health information, etc. is provided to the user.

The semantic index of content can be created by extracting text from the selected content, extracting relevant words from the text, taking into account linguistic features like synonyms and word collocations and generating the semantic index based on the relevant words, synonyms, and word collocations. In other words, a semantic finger print of the selected content is created. The content database provides for each further content of interest a semantic index. If a semantic index of a further content of interest is similar to the semantic index of the selected content of interest, the further content of interest is provided to the user for access, in particular purchasing, reading, storing, etc.

The term semantic index in context of embodiments of the present invention can be understood as a vector representation of a content, e.g., a text document. Each document is represented by a vector in a multidimensional vector space. Such a method is also described in "A Vector Space Model for Automatic Indexing", G. Salton, A. Wong and C. S. Yang—Information Retrieval and Language Processing Communications of the ACM, Volume 18, Number 11, November 1975 which is incorporated herein by reference. Furthermore, such a method is described by the website of the "MOLE Text Analysis Group" which is incorporated herein by reference.

The dimension of such a vector space is equal to the overall number of words to be considered. Each element or dimension, respectively, of a vector representing a text document corresponds to one word from the plurality of words to be considered. For example, if a word does not occur in the text document, the respective element in the vector contains the value zero. If a word occurs in the text document, the respective element contains a non-zero value, e.g., a value corresponding to the weight of the word in the text. The weight of the word in the text is, for example, determined by counting of occurrences of the word in the text document.

Each vector representing one document can be normed so that a position of the vector on a multi-dimensional sphere can be compared by a metric or a similarity function. The comparing via a similarity function can be carried out, e.g., by defining a similarity function in the vector space which reflects the degree of similarity of two vectors to be compared. Such a similarity function can be the inner product of two vectors or an inverse function of the angle between the corresponding vectors.

The document space, i.e. the space defined by all vectors representing documents, can be transformed to reduce complexity or to handle problems occurring with the data set, e.g., by so called indexing by latent semantic analysis. The method of indexing by latent semantic analysis is described in "*Indexing by Latent Semantic Analysis*", Scott Deerwester, Susan Dumais, George Furnas, Thomas Landauer and Richard Harshman—*Journal of the American society for information science,* 1990 which is incorporated herein by reference.

In a preferred embodiment of the method according to the present invention the displaying is executed by a touch-sensitive display adapted to allow a user to selected content of interest from the displayed content. The selection may take place for example by highlighting content of interest from the displayed content. The touch-sensitive display may be part of a computer client, in particular a personal computer, a tablet personal computer, a cellular telephone, a camera, a smart phone, a media player, a navigation device, a game console, or a laptop computer. The touch-sensitive display can be operated by a marking element, for example a stylus, a touch pen or the user's finger.

In a preferred embodiment of the method according to the present invention a user may add further information to the selected content of interest. Such information can be an entity which has been recognized by the user during the observation of the selected content. Furthermore, information from the user's knowledge with regard to the selected content of interest can be added. According to a further preferred embodiment of the method according to the present invention a user may comment on the selected content of interest. Thereby the user may provide additional information to the selected content of interest. A comment can be entered by a keypad or keyboard being part of the computer client or directly on the touch display via a virtual keypad. Furthermore, a comment can be provided by a user via a voice recognition system, for example, in form of a recording device in connection with a voice recognition means as part of the computer client. The user vocalizes the comment which is in response recognized by the voice recognition system and transformed to text information.

In a further preferred embodiment of the method according to the present invention the selecting is executed by creating a rectangle, circle, or free-hand outline surrounding the content of the interest on the display. Thereby a plurality of enhanced tools is available for the user to select a region of the touch display in which the content is displayed. The rectangle, circle, or freehand outline can be drawn onto the touch-sensitive display by a touch gesture. The selected content is then preferably analyzed to automatically create tags relating to text extracted from the content. The user may preferably modify these tags after their creation.

In a further preferred embodiment of the method according to the present invention the selecting is executed by the steps: detecting the contact area of a user's finger or a marking element marking a region of a touch-sensitive display, recording the cumulative area contacted by the user's finger or the marking element during one marking motion, and selecting the content shown in the cumulative area as selected content of interest. Thereby, an additional and enhanced method for selecting the content of interest according to the method for selecting content of interest mentioned above is provided in addition to the creating of a rectangle, circle or freehand outline surrounding the content of the interest to be selected.

According to a further preferred embodiment of the method according to the present invention a distance is defined in a vector space defined by the semantic indices of all content, wherein a further content of interest is provided if the semantic index of the further content of interest lies within a predetermined distance to the semantic index of the selected content of interest. This provides for an enhanced method for retrieving content of interest being similar to the selected content of interest via a metric in the vector space. The comparing via a metric is carried out by defining a distance in the vector space, said vector space being defined by the semantic indices, i.e. vectors, of all contents or documents, respectively. A vector representing a content or document is considered as representing similar content, if the vector lies within a predetermined distance to the vector representing the selected content or document of interest.

In a further preferred embodiment of the method according to the present invention contextual terms being provided by an information database are added to the selected content of interest. This provides for additional information to the user. This additional information can also be used as additional information to the semantic index created from the selected content of interest. The information can be provided by automatically searching an information database with regard to contextual terms based on the terms extracted from the selected content of interest. An information database can be, for example, an encyclopedia or an encyclopedic dictionary. For example, an advertisement shown in a magazine can usually be searched by the keywords mentioned in the advertisement itself. However, according to the present method also additional keywords, tags or other words can be used to enhance the search and, therewith, the likelihood of an advertisement or an article to be found in a search is increased.

According to another preferred embodiment of the method according to the present invention entities are extracted from the selected content of interest, in particular persons, organizations, places, dates, contact information, and/or links, and wherein said entities are matched with information provided by an information database to provide additional information to the selected content of interest. For example, the name of a generally known person can be extracted from the content of interest by recognizing the name of the person in the text contained in the content of interest or recognizing the face in a picture contained in the content of interest. By automatically entering the name of the person into an information database, e.g., via a computer client, additional information concerning the person can be provided to the selected content of interests. For example, the additional information can be shown to the user or words obtained from the additional information can be provided for creating the semantic index of the selected content of interest.

In a further preferred embodiment of the method according to the present invention entities are extracted from the selected content of interest, in particular persons, dates, places, and/or contact information, to be exported to an organizational functionality, in particular an electronic calendar or an electronic address book. For example, a date can be recognized automatically in the text extracted from the content of interest and exported to an electronic calendar. The exporting can take place by adding a deadline according to the extracted date to the electronic calendar and providing additional information concerning the date to the calendar.

In a further preferred embodiment of the method according to the present invention the selected content of interest and/or the provided further content of interest is storable in a personal user database. Such a personal user database is preferably adapted to provide the content to the user at a later point in time, when the user wishes to access, edit or further process the content. The personal user database may be part of a computer client, wherein a memory means in the computer client is adapted to store the selected content of interest and/or the provided further content of interest. Furthermore, the selected content of interest and/or the provided further content of interest are stored via cloud storage services.

In a further preferred embodiment of the method according to the present invention the provided further content is purchasable for storing in a personal user database. This provides for an additional business model, in which the further content is provided by the method according to the present invention, e.g. in form of a thumbnail, and needs to be purchased for storing in the personal user database in a format adapted to be edited, read, and processed further.

According to a preferred embodiment of the method according to the present invention the personal user database is adapted to organize, sort, and/or categorize the selected content of interest and/or the provided further content of interest. This provides the user with further functions to organize content based on the user's personal needs and preferences. For example, a user's collection can be generated and stored in the personal user database containing favorite content and snippets of content of interest. The content database may be adapted to allow the user to search in his or her collection by using a full text search and/or by using text as a filter. The content can be further organized and arranged in albums and the user can further arrange a composition of snippets in the album. The snippet may provide a link to the original content, such as an article, magazine or book. Thereby, the original content of the snippet can be retrieved instantly by a link to the source of the snippet.

A further aspect of the present invention is a system for selecting content of interest, comprising: a content database providing content, in particular publisher content, a computer client having a client display for displaying the content obtained from the content database, a user interface adapted to allow a user to select a content of interest from the displayed content, wherein a computer device is adapted to create a semantic index of the selected content of interest, to provide further content of interest from the content provided by the content database based on a semantic index of the further content of interest, and to compare the semantic index of the further content of interest to the semantic index of the selected content of interest.

A further aspect of the present invention is a method for purchasing content of interest, in particular publisher content, comprising the steps: obtaining content being purchasable from a content database, wherein the content contains a plurality of subject matters, processing the content by extracting a plurality of sub-contents from the obtained content depending on the subject matter of the sub-contents, selecting a sub-content from the processed content, and purchasing the sub-content for storing the sub-content in a personal user database. This provides for an innovative business model for purchasing content to be stored in a personal user database. In contrast to the existing business models, the present method provides a user with the ability to extract a sub-content from a purchasable content in a way adapted to the individual needs or preferences and to purchase this sub-content for storing it in a personal user database. This simplifies consuming and utilizing information of personal interest, especially in an environment of digital content overload. Furthermore, by the proposed method the needs and wishes of today's consumers are addressed to allow them to collect, store, manage, and discover individually selected digital content in a personalized and efficient way.

The different subject matters can preferably be different topics of articles or books. The extraction of sub-content takes into account the different subject matters. For example, from one article different sections containing different topics can be extracted as sub-content.

According to a preferred embodiment of the method according to the present invention the content is a published magazine, newspaper, book, monograph, and/or periodical, an issue of a published magazine, newspaper, book, and/or periodical, an article of a published magazine, newspaper, and/or periodical, and/or a section of a book. For example, magazines and articles are displayed on a personal computer client to be purchased by the user. The user can select a sub-content from the displayed magazines or articles and purchase the sub-content for storing it in his or her personal user database, wherein the personal user database can be an integral part of the computer client.

In a further preferred embodiment of the method according to the present invention the sub-content is an issue of a published magazine, newspaper, book, and/or periodical, an article of a published magazine, newspaper, and/or periodical, a section of a book, or a snippet of an article of a published magazine, newspaper, and/or periodical. As an example the user may select a snippet from an article of a published newspaper and purchase such a snippet to store it in the user's personal user database. As another example, the user may select an article from a published magazine as a sub-content for purchasing this article and for storing it in the personal user database.

In a further preferred embodiment of the method according to the present invention the subject matters are articles, advertisements, pictures, and/or topics. The extraction of a plurality of sub-contents from the obtained content takes place for example by taking into account these subject matters. For example, the content is processed by dividing it into sub-content which is categorized into articles, advertisements, pictures and/or categorized which respect to different topics. Thereby, the user may select a sub-content, for example an advertisement shown in a magazine and store the advertisement in the personal user database. As another example, the user may select a picture from an article to store the picture in the personal user database.

In a further preferred embodiment of the method according to the present invention the personal user database is an integral part of a personal computer client, in particular a personal computer a tablet personal computer, a cellular telephone, a camera, a smart phone, a media player, a navigation device, a game console, or a laptop computer.

According to a further preferred embodiment of the method according to the present invention the personal user database is adapted to organize, sort, and/or categorize the selected content of interest and/or the provided further content of interest.

A further aspect of the present invention is a system for purchasing content of interest, in particular publisher content, comprising a content database adapted to provide content containing a plurality of subject matters to a computer client, wherein the computer client is adapted to extract a plurality of sub-contents from the obtained content depending on the subject matter of the sub-contents, a display adapted to display the content provided by the content database, a user interface adapted to allow a user to select a sub-content being purchasable from the processed content, and a personal user database adapted to store the purchased sub-content.

DETAILED DESCRIPTION OF THE INVENTION

Figure 1:
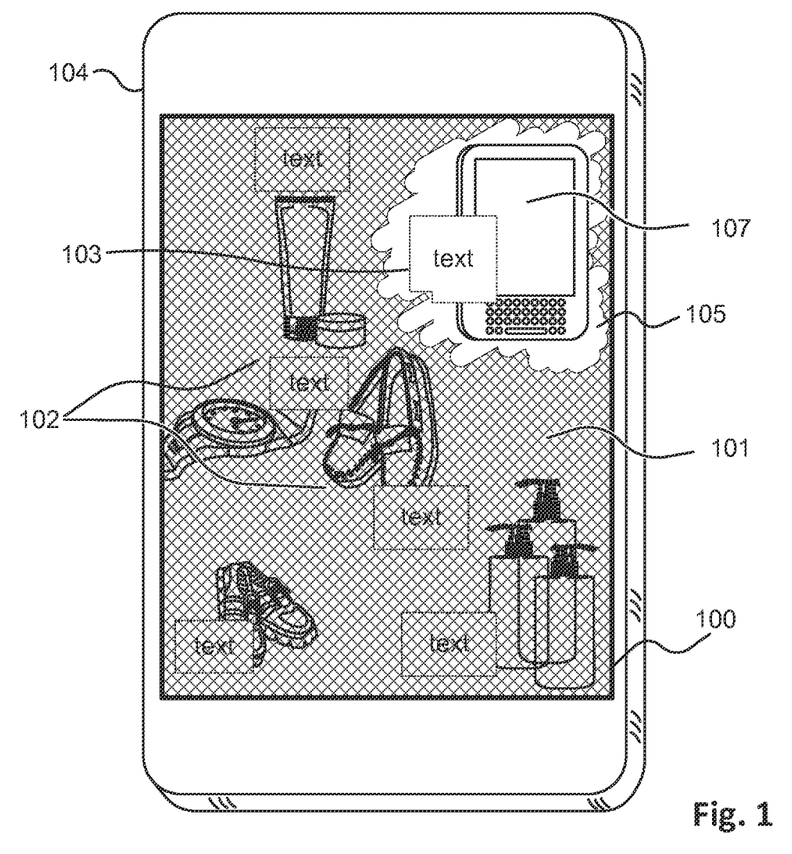
FIG. 1 illustrates an example device having a touch-sensitive display for selecting content of interest from a content displayed on the touch-sensitive display.

FIG. 1 illustrates an example device having a touch-sensitive display 100 of a user interface 101 which displays content 102, in particular publisher content in form of an advertisement 103. The user interface is part of a computer client in form of a tablet personal computer 104.

The touch-sensitive display 100 highlights a cumulative area 105 which has been contacted by a user's finger during a marking motion. The user interface 101 processes a content of interest 107 being shown in the cumulative area 105 as selected content of interest 107, i.e. the user interface 101 extracts text from the content of interest 107, recognizes pictures shown in the content of interest 107, and/or recognizes faces shown in the pictures in the content of interest.

To achieve a selection of the content of interest 107 the touch-sensitive display 100 detects a contact area of the user's finger or a marking element marking a region of the touch-sensitive display 100. A recording entity as part of the computer client records the cumulative area 105 contacted by the user's finger or the marking element during one marking motion. One marking motion can be a single wiping motion by the finger or a plurality of wiping motions in different directions and at different regions of the touch-sensitive display. Preferably, one marking motion means that the finger is not lifted from the touch-sensitive display during said marking motion. I.e. if the finger is lifted from the touch-sensitive display, the computer client processes the marking motion as being completed. Further preferably, the computer client processes the marking motion as being completed when the finger is lifted from the touch-sensitive display for at least a predetermined time interval.

Subsequent to the completion of a marking motion, the computer client processes the content shown in the cumulative area 105 as selected content of interest.

Figure 2:
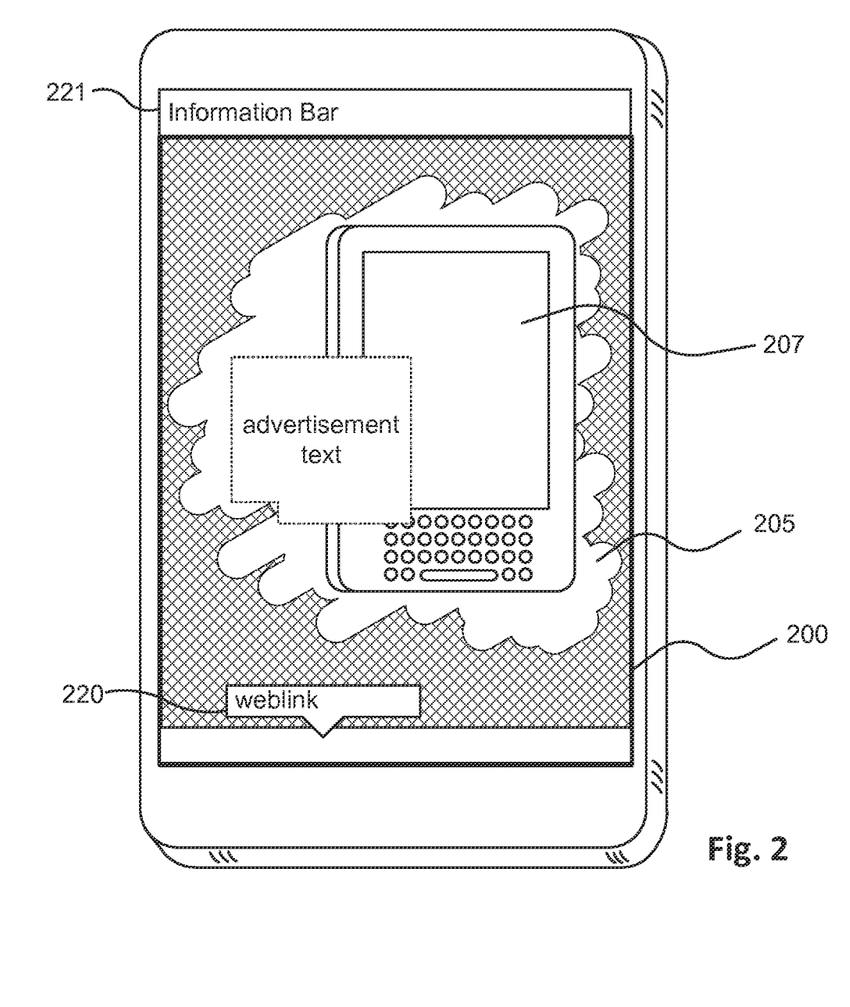
FIG. 2 illustrates the device of FIG. 1 displaying an enlarged view of selected content of interest.

FIG. 2 illustrates an enlarged view of selected content of interest 207 as shown in FIG. 1 as selected content of interest 107. The cumulative area 205 is highlighted on the touch-sensitive display 200 by hatching the area which is not the cumulative area. A web link extracted from the content of interest 207 is shown as a selectable button 220 on the touch-sensitive display 200. Further information which corresponds to the content of interest 207 is shown in an information bar 221. This information bar 221 may contain contextual terms concerning the content of interest 207 which are provided by an information database. Furthermore entities can be extracted from the selected content of interest 207, in particular persons, organizations, places, dates, contact information, and/or links. Said entities can be matched with information provided by an information database to provide additional information to the respective selected content of interest on the information bar 221.

Figure 3:
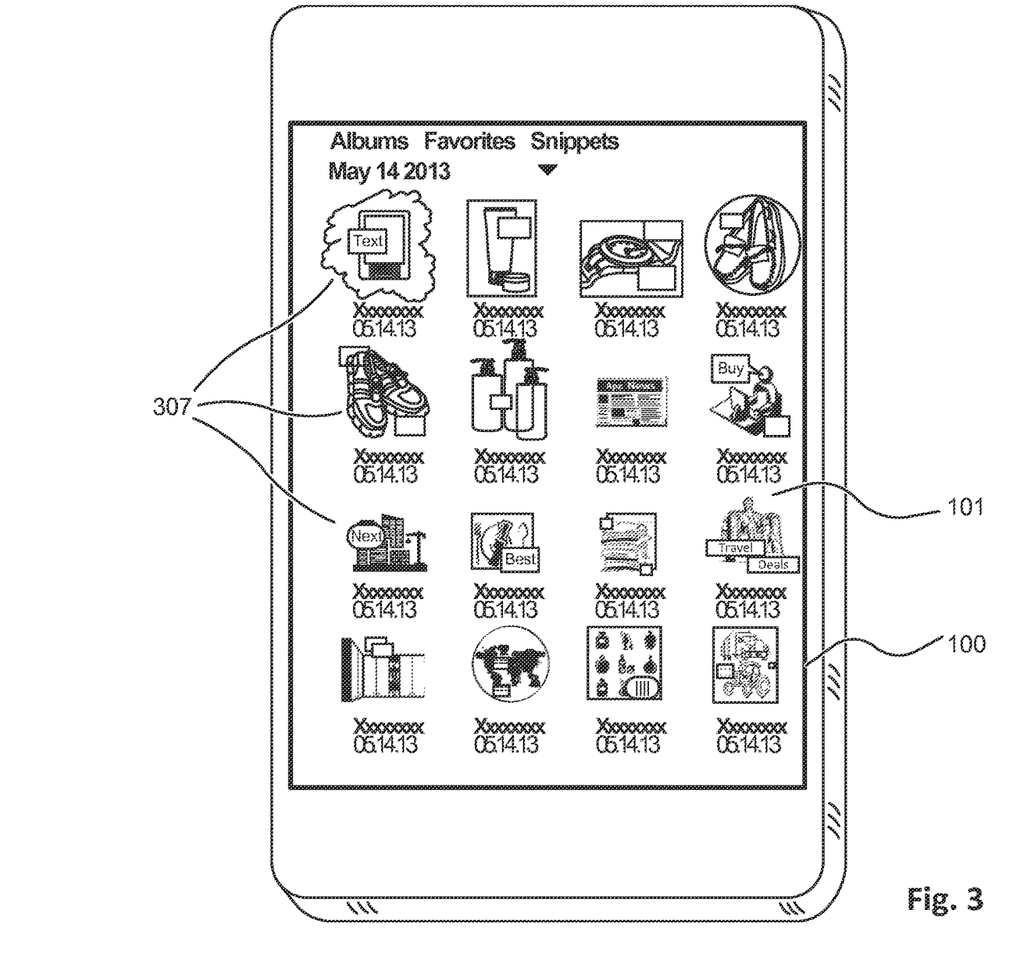
FIG. 3 illustrates the device of FIG. 1 displaying a plurality of contents of interest having been selected by utilizing the user interface.

FIG. 3 illustrates a device having a touch-sensitive display 100 as shown in FIG. 1 displaying a plurality of contents of interest 307 having been selected by utilizing the user interface 101. The plurality of contents of interest 307 are displayed in form of a collection of snippets which have each been selected from a publisher content beforehand. By tapping on one of the snippets, the user may select the snippet for displaying it in an enlarged view, e.g., as depicted in FIG. 2. The user can further select a snippet to write comments and attach them to the snippet. Each snippet can be shared by use of a social network provider or via email to the contacts of the user. The user can further add snippets to the collection or apply it to a calendar or contact list. If the snippet contains address information or dates, it is automatically added as further information to the snippet. As an example, information such as address information or dates is sent to the calendar or address book after a confirmation by the user. Then a new entry and a link back to the snippet itself is added to the calendar or address book. Even further, automatic reminders in connection with organizational tools can be provided to the user with respect to a snippet.

The collection of selected contents of interest 307 can be stored in a personal user database. Such a personal user database can be adapted to organize, sort, and/or categorize the selected content of interest 307 and/or can be adapted to provide further content of interest. Even further, the selected content of interest can be collected and stored in folders which can be displayed on the display to organize the collected content of interest. For example, one snippet can be inserted to a plurality of folders. It is further possible to share the folders and the content of the folders with other users, e.g., via a social network provider or via email. Furthermore, it is possible to display all folders that contain a selected content of interest.

A plurality of contents of interest, e.g., snippets may be displayed in a collage form. The user may select a snippet from the collage by touching the graphical realization of the snippet. This can lead to a display of the original content, e.g., the original document or content from which the snippet was extracted. Furthermore, pictures, e.g. pictures from the user's picture collection which are not provided from publisher content, may be added to the collection.

Figure 4:
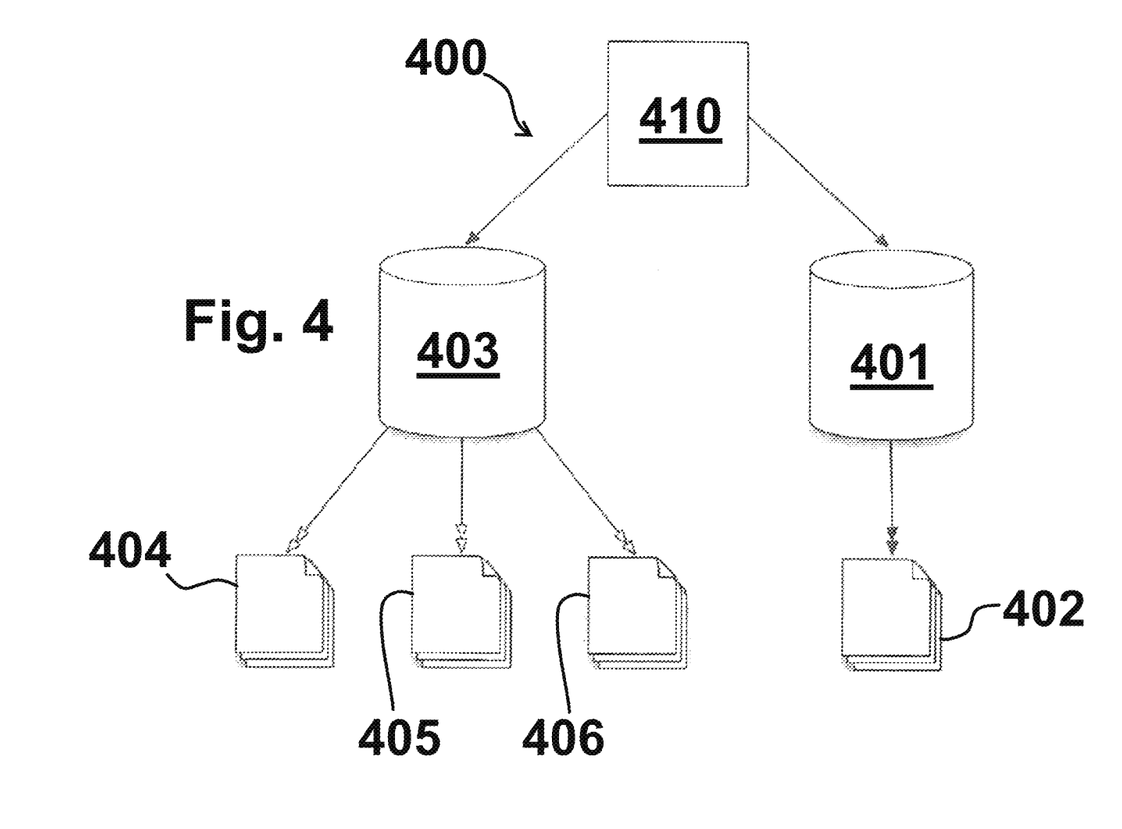
FIG. 4 illustrates schematically a system comprising a reader device for allowing a user to access, organize, sort, and categorize publisher content.

FIG. 4 illustrates schematically a system 400 comprising a reader device 410, e.g. a computer client, for allowing a user to access, select, organize, sort, and categorizes publisher content such as published magazines, newspapers, books, monographs, and/or periodicals, issues of published magazines, newspapers, books, and/or periodicals, articles of published magazines, newspapers, and/or periodicals, sections of books, or snippets of published magazines, newspapers, books, and/or periodicals. FIG. 4 illustrates the architecture of the system 400 in a schematic way. The reader device 410 may access a content database 401 providing purchasable content containing a plurality of subject matters. The content can be stored in the content database 401 in form of PDF-documents 402 (PDF: Portable Document Format) or any other electronic format of choice such as HTML, XML, etc. When the reader device 410 obtains content from the content database 401, it processes the content by extracting a plurality of sub-contents from the obtained content depending on the subject matter of the sub-contents. The processed content and the sub-contents selected by a user by using the reader device 410 may be stored in a personal user database 403. The personal user database 403 is adapted to organize, sort, and/or categorize the selected content. For example, the personal user database 403 may categorize the content into the categories PDFs 404, favorite articles 405 and snippets 406. The reader device 410 may be adapted to provide the user with functionalities for purchasing a sub-content from the content obtained from the content database 401. Such a sub-content can be, e.g. an article extracted from a magazine. The storing may also be carried out by cloud storing means, where the content data is stored in a plurality of storage servers provided by a storage service provider or provided by third parties.

Figure 5:
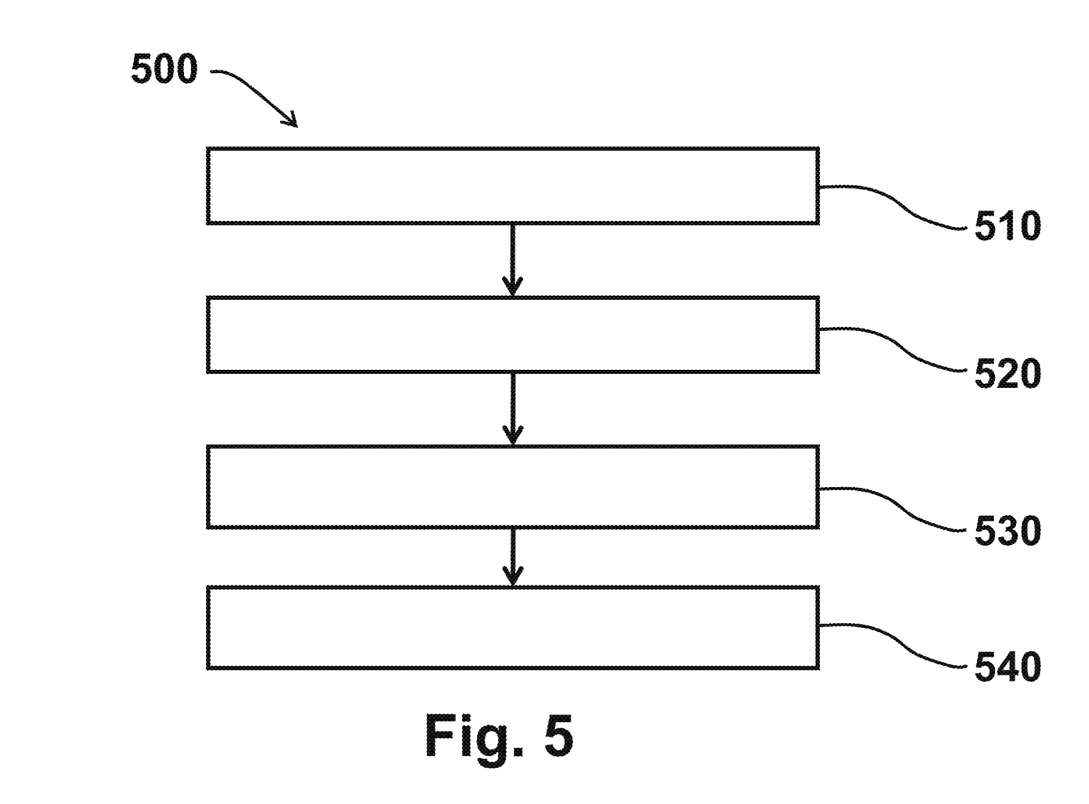
FIG. 5 illustrates a flow diagram of an exemplary process for providing content of interest to a user.

FIG. 5 illustrates a flow diagram of an example process 500 for providing content of interest to a user. Process 500 will be described in reference to a system for implementing process 500.

In a first process step 510, the system can display content provided by a content database 401 as shown in FIG. 4, in particular publisher content. The content can be displayed on a touch-sensitive display being part of a computer client, in particular a personal computer, a tablet personal computer, a cellular telephone, a camera, a smart phone, a media player, a navigation device, a game console, or a laptop computer. The displayed content may be a published magazine, newspaper, book, monograph, and/or periodical an issue of a published magazine, newspaper, book, and/or periodical, an article of a published magazine, newspaper, and/or periodical, a section of a book, or a snippet of a published magazine, newspaper, book, and/or periodical. In a further process step 520, a user may select a content of interest displayed on the touch-sensitive display by drawing a rectangle, circle, or freehand outline surrounding the content of interest on the display. The selection of the content of interest can also take place by a wiping motion executed by the user on the touch-sensitive display. During the wiping motion the touch-sensitive display detects the contact area of the user's finger marking a region of the touch-sensitive display. The cumulative area contacted by the user's finger is recorded by a recording entity as part of the computer client. The content shown in the cumulative area is then selected as content of interest.

The system then creates a semantic index of the selected content of interest in a further process step 530. In some embodiments, the semantic index may be created by a computer device such as a computer client, or a server computer (or data processors residing therein), which can be remote from the computer client. The semantic index can be a vector representation of a content, e.g., a text document. Each document is represented by a vector in a multi-dimensional vector space. The dimension of such a vector space is equal to the overall number of words to be considered. Each element or dimension, respectively, of a vector representing a text document corresponds to one word from the plurality of words to be considered. For example, if a word does not occur in the text document, the respective element in the vector contains the value zero. If a word occurs in the text document, the respective element contains a non-zero value, e.g., a value corresponding to the weight of the word in the text. The weight of the word in the text is, for example, determined by counting of occurrences of the word in the text document.

The computer client provides in a further process step 540 further content of interest from the content provided by the content database based on a semantic index of the further content of interest by comparing the semantic index of the further content of interest to the semantic index of the selected content of interest. Therefore, each vector representing one document can be normed so that a position of the vector on a multi-dimensional sphere can be compared by a metric or a similarity function. The comparing via a similarity function can be carried out, e.g., by defining a similarity function in the vector space which reflects the degree of similarity of two vectors to be compared. Such a similarity function can be the inner product of two vectors or an inverse function of the angle between the corresponding vectors.

The user may add further information to the selected content of interest, for example, the user may comment the selected content of interest by entering comments into the touch-sensitive display. Moreover, the computer client may add contextual terms being provided by an information database to the selected content of interest.

The comparing of the semantic index of the selected content of interest to the semantic index of the further content of interest may take place via a metric by defining a distance in a vector space, said vector space being defined by the semantic indices, i.e. vectors, of all contents or documents, respectively. A vector representing a content or document is considered as representing similar content, if this vector lies within a predetermined distance to the vector representing the selected content or document of interest. In other words, each semantic index of a content is located in a multi-dimensional vector space, in which a metric is defined to handle distances between the semantic indices. The semantic indices of contents being contextually related are located close to each other in the multi-dimensional space. The metric defines a semantic context for a preferred content of interest. I.e. contents that share a common topic will share a neighborhood in the vector space.

The selected content of interest and/or the provided further content of interest are storable in a personal user database 403 as shown in FIG. 4. The further content of interest may be provided by a content database 401 as shown in FIG. 4. The provided further content of interest may be purchasable for storing in the personal user database. The personal user database is adapted to organize, sort, and/or categorize the selected content of interest and/or the provided further content of interest.

Figure 6:
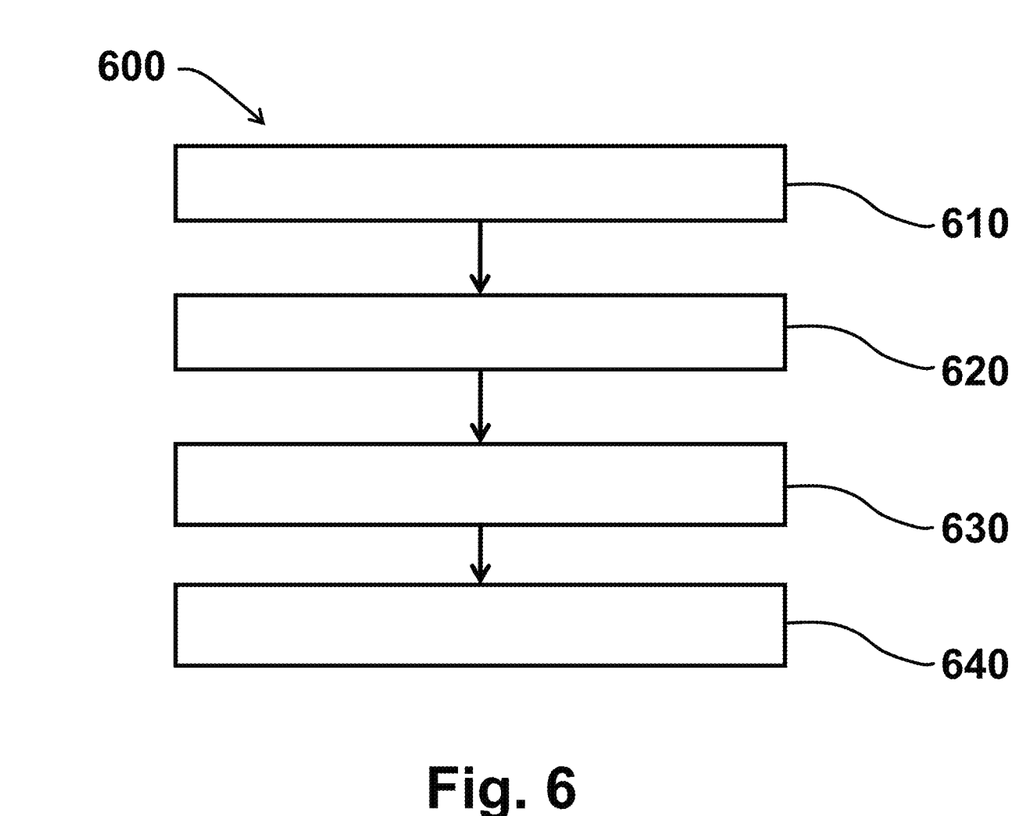
FIG. 6 illustrates a flow diagram of an exemplary process for purchasing content of interest, in particular publisher content.

FIG. 6 illustrates a flow diagram of an exemplary process 600 for purchasing content of interest, in particular publisher content. For convenience, example process 600 will be described in reference to a system for purchasing content of interest that performs process 600.

The system may obtain in a first process step 610 content being purchasable from a content database, wherein the content contains a plurality of subject matters. Such content may be a published magazine, newspaper, book, monograph, and/or periodical, an issue of a published magazine, newspaper, book, and/or periodical, an article of a published magazine, newspaper, and/or periodical. The subject matters of the content may be articles, advertisements, pictures, or topics.

In a further process step 620, the system may process the content by extracting a plurality of sub-contents from the obtained content with respect to different subject matters. A sub-content may be an issue of a published magazine, newspaper, and/or periodical, an article of a published magazine, newspaper, and/or periodical, or a snippet of a published magazine, newspaper, and/or periodical. For example, a magazine being provided in form of a PDF-document is processed by the system and sub-content is extracted, e.g. an issue of a magazine, an article of a magazine, a snippet of an article, an advertisement, or a picture shown in the magazine.

This extracted sub-content may be selected by a user in process step 630. The selection may take place, e.g., in a way as illustrated in the FIGS. 1 and 2. Additionally, sub-content can be provided which is similar to selected content of interest by a method as shown in FIG. 5. In a further process step 640 the user may purchase the sub-content for storing the sub-content in a personal user database. The personal user database may be an integral part of a personal computer client, in particular a personal computer, a tablet personal computer, a cellular telephone, a camera, a smart phone, a media player, a navigation device, a game console, or a laptop computer. The personal user database may be adapted to organize, sort, and/or categorize the selected content of interest and/or the provided further content of interest. The selection and the purchasing may be executed through a user interface adapted to allow the user to select a sub-content being purchasable from the processed content.

Figure 7:
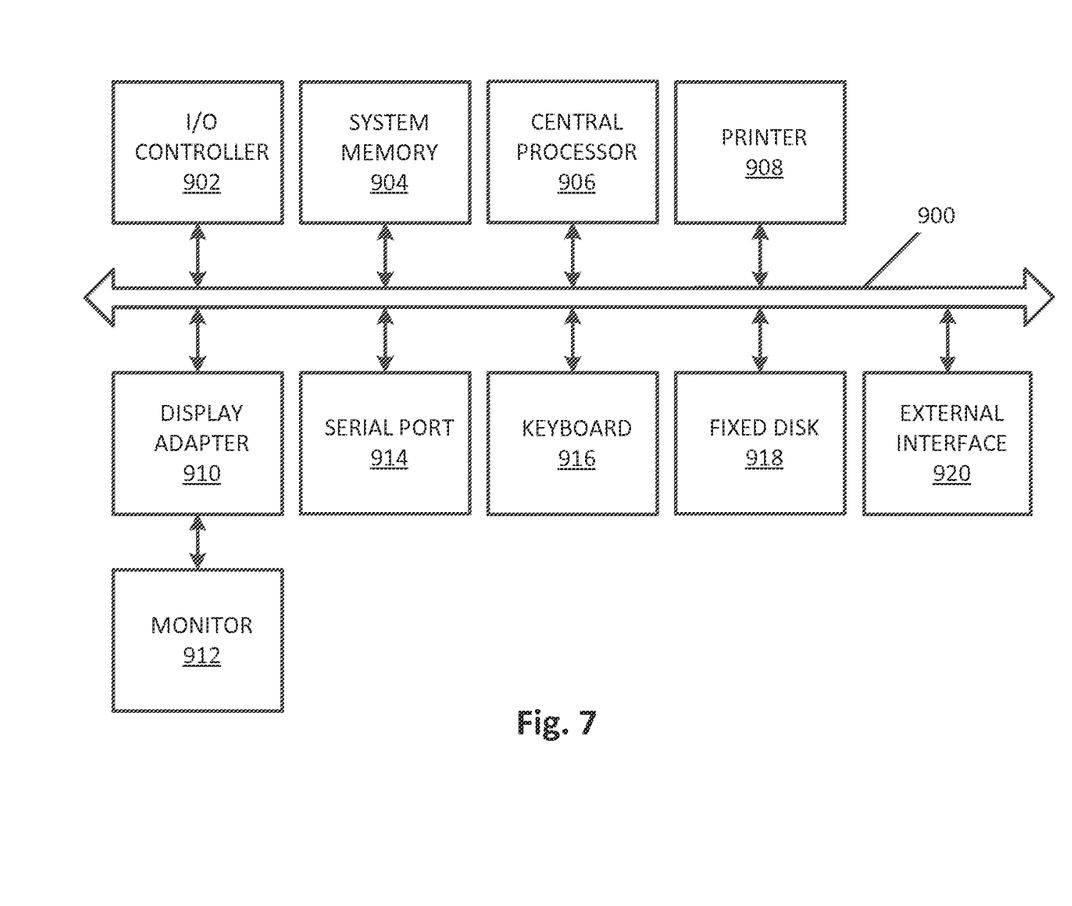
FIG. 7 shows a block diagram of components of a computer apparatus.

The various computers (e.g., the computer client, server computer, etc.) described above may use any suitable number of subsystems to facilitate the functions described herein. Examples of such subsystems or components are shown in FIG. 7. The subsystems such as a printer 908, keyboard 916, fixed disk 918 (or other memory comprising computer readable media), monitor 912, which is coupled to a display adapter 910, and others are shown. Peripherals and input/output (I/O) devices, which couple to I/O controller 902, can be connected to the computer system by any number of means known in the art, such as serial port 914. For example, serial port 914 or external interface 920 can be used to connect the computer apparatus to a wide area network such as the Internet, a mouse input device, or a scanner. The interconnection via system bus 900 allows the central processor 906 to communicate with each subsystem and to control the execution of instructions from system memory 904 or the fixed disk 918, as well as the exchange of information between subsystems. The system memory 904 and/or the fixed disk 918 may embody a computer readable medium.

Specific details regarding some of the above-described aspects are provided below. The specific details of the specific aspects may be combined in any suitable manner without departing from the spirit and scope of embodiments of the invention.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary.

What is claimed is:

1. A method for providing content of interest to a user, comprising the steps:

providing for a display, by a touch sensitive display, of content provided by a content database;

receiving, by a processor, selected content of interest from the displayed content, wherein said selected content of interest is selected by a user using the touch sensitive display as a user interface;

extracting text out of the content of interest and creating, by the processor, a semantic index of the extracted text of the selected content of interest, taking into account synonyms and word collocations, wherein creating the semantic index of the extracted text comprises calculating, by the processor, a first vector representing the semantic index in a multi-dimensional vector space, wherein the dimension of the vector space is equal to a number of words to be considered out of the text extracted from the content of interest, and adding further information related to the selected content of interest;

calculating, by the processor, a number of further vectors each representing a further semantic index in a document contained in a content database, wherein the further vectors are associated with further semantic indices, wherein each further vector is a vector in a multidimensional vector space, wherein an element of each further vector is zero if a word corresponding to said element does not occur in the document, and an element of said vector contains a non-zero value corresponding to counted occurrence of the word in the document; and providing further content of interest from the content provided by the content database based on a semantic index of the further content of interest by comparing the further semantic indices of the further content of interest to the semantic index of the selected content of interest by comparing the first vector calculated for the content of interest to each of the further vectors calculated for each of the documents in the content database, and also by using the further information related to the selected content of interest.

2. The method of claim 1, wherein the touch-sensitive display is adapted to allow a user to select content of interest from the displayed content.

3. The method of claim 1, further comprising:
receiving, by the processor, the further information related to the selected content of interest from the user.

4. The method of claim 3, further comprising:
receiving, by the processor, comments on the selected content of interest by the user.

5. The method of claim 1, wherein the content of interest is selected by creating a rectangle, circle, or freehand outline surrounding the content of interest on the touch-sensitive display.

6. The method of claim 1, wherein the content of interest is selected by:
detecting the contact area of a user's finger or a marking element marking a region of the touch-sensitive display,
recording the cumulative area contacted by the user's finger or the marking element during one marking motion, and
selecting the content shown in the cumulative area as the selected content of interest.

7. The method of claim 1,
wherein a distance is defined in a vector space defined by the semantic indices of all content, and
wherein the further content of interest is provided if the semantic index of the further content of interest lies within a predetermined distance to the semantic index of the selected content of interest.

8. The method of claim 1, wherein contextual terms being provided by an information database are the further information.

9. The method of claim 1,
wherein entities are extracted from the selected content of interest, the entities including at least one of particular persons, organizations, places, dates, contact information, and/or links, and
wherein said entities are matched with the further information related to the selected content of interest.

10. The method of claim 1,
wherein entities are extracted from the selected content of interest, the entities including at least one of particular persons, dates, places, and/or contact information, to be exported to an organizational functionality comprising an electronic calendar or an electronic address book.

11. The method of claim 1,
wherein the selected content of interest and/or the provided further content of interest is storable in a personal user database.

12. The method of claim 1,
wherein the provided further content is purchasable for storing in a personal user database.

13. The method of claim 12,
wherein the personal user database is adapted to organize, sort, and/or categorize the selected content of interest and/or the provided further content of interest.

14. The method of claim 1 wherein the further information is in the form of keywords, tags, or other words.

15. A system comprising a processor, and a computer readable medium coupled to the processor, the computer readable medium comprising code executable by the processor for implementing a method comprising:
providing for a display, by a touch sensitive display, of content provided by a content database;
receiving, by a processor, selected content of interest from the displayed content, wherein said selected content of interest is selected by a user using the touch sensitive display as a user interface;
extracting text out of the content of interest and creating, by the processor, a semantic index of the extracted text of the selected content of interest, taking into account synonyms and word collocations, wherein creating the semantic index of the extracted text comprises calculating, by the processor, a first vector representing the semantic index in a multi-dimensional vector space, wherein the dimension of the vector space is equal to a number of words to be considered out of the text extracted from the content of interest, and adding further information related to the selected content of interest;
calculating, by the processor, a number of further vectors each representing a further semantic index in a document contained in a content database, wherein the further vectors are associated with further semantic indices, wherein each further vector is a vector in a multidimensional vector space, wherein an element of each further vector is zero if a word corresponding to said element does not occur in the document, and an element of said vector contains a non-zero value corresponding to counted occurrence of the word in the document; and
providing further content of interest from the content provided by the content database based on a semantic index of the further content of interest by comparing the further semantic indices of the further content of interest to the semantic index of the selected content of interest by comparing the first vector calculated for the content of interest to each of the further vectors calculated for each of the documents in the content database, and also by using the further information related to the selected content of interest.

16. The system of claim 15 wherein the further information is in the form of keywords, tags, or other words.

17. The system of claim 15, wherein the content of interest is selected by creating a rectangle, circle, or freehand outline surrounding the content of interest on the touch-sensitive display.

18. The system of claim 15, wherein the content of interest is selected by:
   detecting the contact area of a user's finger or a marking element marking a region of the touch-sensitive display,
   recording the cumulative area contacted by the user's finger or the marking element during one marking motion, and
   selecting the content shown in the cumulative area as the selected content of interest.

19. The system of claim 15,
   wherein a distance is defined in a vector space defined by the semantic indices of all content, and
   wherein the further content of interest is provided if the semantic index of the further content of interest lies within a predetermined distance to the semantic index of the selected content of interest.

* * * * *